US009185229B2

(12) United States Patent
Logan et al.

(10) Patent No.: US 9,185,229 B2
(45) Date of Patent: *Nov. 10, 2015

(54) METHOD OF JOINING A CONFERENCE CALL

(71) Applicant: BlackBerry Limited, Waterloo, CA (US)

(72) Inventors: Adrian Logan, Waterloo (CA); Rohit Jain, Waterloo (CA); Eric Fritzley, Waterloo (CA); Christopher Labrador, Waterloo (CA); Michael McAndrews, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,143

(22) Filed: Jul. 22, 2014

(65) Prior Publication Data

US 2015/0023222 A1    Jan. 22, 2015

Related U.S. Application Data

(63) Continuation of application No. 12/393,450, filed on Feb. 26, 2009, now Pat. No. 8,824,341.

(60) Provisional application No. 61/152,450, filed on Feb. 13, 2009, provisional application No. 61/152,473, filed on Feb. 13, 2009.

(51) Int. Cl.
*H04M 3/56* (2006.01)
*G06Q 10/10* (2012.01)
(Continued)

(52) U.S. Cl.
CPC .............. *H04M 3/567* (2013.01); *G06Q 10/109* (2013.01); *H04L 12/1813* (2013.01);
(Continued)

(58) Field of Classification Search
CPC ......... H04L 12/16; H04L 12/18; H04M 3/42; H04M 3/56; H04M 3/562; H04M 3/567
USPC .......................................................... 370/260
See application file for complete search history.

(56) References Cited

U.S. PATENT DOCUMENTS 6,148,068 A    11/2000  Lowery
6,717,938 B1    4/2004  D'Angelo
(Continued)

FOREIGN PATENT DOCUMENTS

CA    2560687 A1    9/2006
CA    2541562 A1    9/2007
(Continued)

OTHER PUBLICATIONS

Canadian Office Action dated Oct. 11, 2012, issued in related Canadian Application No. 2690117 (4 pages).
Canadian Office Action dated Nov. 12, 2013, issued in related Canadian Application No. 2690117 (4 pages).
(Continued)

*Primary Examiner* — Farah Faroul
(74) *Attorney, Agent, or Firm* — Fish & Richardson P.C.

(57) ABSTRACT

In a computer-implemented method of joining a user to a conference call event an interface associated with a time management software application is displayed. The interface displays information relating to the conference call event including a date for a conference call which is subject of the conference call event and a start time of the conference call. While displaying the interface, a menu offering one or more options is displayed; these one or more options include an option to join the conference call. When an indication of a selection of the option to join the conference call is received, information associated with the conference call is located; this information includes a telephone number for a conference call bridge. A connection with the conference call bridge using the telephone number is initiated.

22 Claims, 16 Drawing Sheets

(51) Int. Cl.
*H04L 12/18* (2006.01)
*H04L 12/58* (2006.01)
*H04M 3/42* (2006.01)

(52) U.S. Cl.
CPC ............ *H04L 12/1818* (2013.01); *H04M 3/56* (2013.01); *H04L 12/1822* (2013.01); *H04L 12/58* (2013.01); *H04M 3/42* (2013.01)

(56) References Cited

U.S. PATENT DOCUMENTS

| | | |
|---|---|---|
| 6,828,992 B1 | 12/2004 | Freeman et al. |
| 2002/0128036 A1 | 9/2002 | Yach et al. |
| 2004/0153973 A1 | 8/2004 | Horwitz |
| 2005/0213724 A1 | 9/2005 | O'Brien et al. |
| 2006/0010197 A1 | 1/2006 | Ovenden |
| 2006/0088152 A1 | 4/2006 | Green et al. |
| 2006/0258358 A1 | 11/2006 | Kallio |
| 2007/0070940 A1 | 3/2007 | Vander Veen et al. |
| 2007/0091906 A1 | 4/2007 | Croy et al. |
| 2007/0180060 A1 | 8/2007 | Patel et al. |
| 2007/0280459 A1 | 12/2007 | Yee et al. |
| 2007/0286388 A1 | 12/2007 | Vaught et al. |
| 2008/0013706 A1 | 1/2008 | Kelley et al. |
| 2008/0037748 A1 | 2/2008 | Jefferson et al. |
| 2008/0155029 A1 | 6/2008 | Helbling et al. |
| 2008/0159490 A1* | 7/2008 | Gaudin et al. ............. 379/88.16 |
| 2008/0298278 A1* | 12/2008 | Thakkar et al. .............. 370/260 |
| 2009/0086952 A1* | 4/2009 | Geppert et al. .......... 379/204.01 |
| 2009/0146908 A1 | 6/2009 | LeJeune et al. |
| 2009/0220063 A1 | 9/2009 | Miller et al. |
| 2009/0274283 A1 | 11/2009 | Jain et al. |
| 2010/0005142 A1 | 1/2010 | Xiao et al. |
| 2010/0020728 A1 | 1/2010 | Jefferson et al. |
| 2010/0022225 A1* | 1/2010 | Benger et al. ............. 455/414.1 |
| 2010/0188475 A1 | 7/2010 | Le Goff et al. |
| 2010/0208625 A1 | 8/2010 | Logan et al. |
| 2010/0211911 A1 | 8/2010 | Logan et al. |
| 2011/0075826 A1 | 3/2011 | Block |
| 2011/0216179 A1 | 9/2011 | Dialameh et al. |
| 2011/0289224 A1 | 11/2011 | Trott |
| 2013/0143539 A1* | 6/2013 | Baccay et al. ................ 455/416 |

FOREIGN PATENT DOCUMENTS

| | | |
|---|---|---|
| WO | 2005/104512 A1 | 11/2005 |
| WO | 2007/033495 A1 | 3/2007 |
| WO | 2008/053467 A2 | 5/2008 |

OTHER PUBLICATIONS

Extended European Search Report dated Jun. 17, 2009, issued in related European Application No. 09153754.8 (6 pages).
European Examination Report dated Jan. 31, 2011, issued in related European Application No. 09153754.8 (6 pages).
Office Action dated May 13, 2011, issued in related U.S. Appl. No. 12/393,515 (20 pages).
Final Office Action dated Oct. 7, 2011, issued in related U.S. Appl. No. 12/393,515 (21 pages).
Office Action dated Mar. 14, 2012, issued in related U.S. Appl. No. 12/393,515 (24 pages).
Final Office Action dated Sep. 19, 2012, issued in related U.S. Appl. No. 12/393,515 (22 pages).
Office Action dated Aug. 30, 2013, issued in related U.S. Appl. No. 12/393,515 (37 pages).
Final Office Action dated Jan. 30, 2014, issued in related U.S. Appl. No. 12/393,515 (35 pages).
"Intercall Mobile Assistant", retrieved from Internet Archive Wayback Machine on Jul. 4, 2008; http://web.archive.org/web/20080704053417/http://mobile.intercall.com/nav_bar.htm (2 pages).
"Mobile Assistant User Guide", retrieved from Internet Archive Wayback Machine on Oct. 6, 2008; http://wayback.archive.org/web/*/http://www.mobile.intercall.com/files/MobileAssistantUserGuide . . . (1 page).
"ring2 conferencing", retrieved from Internet Archive Wayback Machine on Mar. 16, 2008; http://web.archive.org/web/20080316022106/http://ring2.com/services_index.aspx (3 pages).
"Control your conference calls from your BlackBerry® smartphone", retrieved from Internet Archive Wayback Machine on Mar. 6, 2009; http://web.archive.org/web/20090306143654/http://ring2.com/pdf/downloads/1181_R2_Blackberry_PRINT.pdf (1 pages).
Office Action dated Jun. 22, 2012, issued in related U.S. Appl. No. 12/393,450 (13 pages).
Final Office Action dated Nov. 15, 2012, issued in related U.S. Appl. No. 12/393,450 (14 pages).
Office Action dated Mar. 22, 2013, issued in related U.S. Appl. No. 12/393,450 (12 pages).
Final Office Action dated Aug. 15, 2013, issued in related U.S. Appl. No. 12/393,450 (11 pages).
Notice of Allowance dated Jan. 6, 2014, issued in related U.S. Appl. No. 12/393,450 (10 pages).
Notice of Allowance dated Apr. 23, 2014, issued in related U.S. Appl. No. 12/393,450 (5 pages).
Extended European Search Report dated Jun. 2, 2009, issued in related European Application No. 09153758.9, 7 pages.

* cited by examiner

| New Conference Call | | }330 |
|---|---|---|
| Subject: ▮ | | }331 |
| Location: | | }332 |
| ○All Day Event | | }333 |
| Start: | Wed, Aug 8, 2007 9:00 AM | }334 |
| End: | Wed, Aug 8, 2007 9:30 AM | }335 |
| Duration: | 0 Hours 30 Mins | }336 |
| Time Zone: | Eastern Time (-5) | }337 |
| Show Time As: | Busy | }338 |
| Reminder: | 15 Min | }339 |
| Recurrence: NoRecurrence: | None | }345 |
| ○Mark as Private | | }346 |
| Notes: | | }347 |

| New Conference Call | |
|---|---|
| Subject: ▮ | |
| Location: | |
| ○All Day Event | |
| Start: | Wed, Aug 8, 2007 9:00 AM |
| End: | Wed, Aug 8, 2007 9:30 AM |

| Paste | 0 Hours 30 Mins |
|---|---|
| CheckSpelling | Eastern Time (-5) |
| Save | Busy |
|  | 15 Min |
| Invite Attendee | None |
| Show Symbols |  |
| SwitchApplication |  |
| Close |  |

324 — Invite Attendee
322 —

FIG. 9D

```
                                                          ─350
┌─────────────────────────────────────────────┐
│ Conference Call Details                     │
├─────────────────────────────────────────────┤
│ Subject: Team Meeting                       │
│ Location: Atlantis, Room 204                │
├─────────────────────────────────────────────┤
│ ○All Day Event                              │
│ Start:            Wed, Aug 8, 2007 9:00 AM  │
│ End:              Wed, Aug 8, 2007 9:30 AM  │
│ Duration:                  0 Hours 30 Mins  │
│ Time Zone:               Eastern Time (-5)  │
│ Show Time As:                         Busy  │
│ Reminder:                           15 Min  │
├─────────────────────────────────────────────┤
│ Notes:                                      │
│ Discuss next step for customer engagement   │
│ Call in information:                        │
│ Toll Free #:   18885551234                  │
│ Security Code: 1234567                    ▼ │
└─────────────────────────────────────────────┘
```

FIG. 12

METHOD OF JOINING A CONFERENCE CALL

CROSS REFERENCE TO RELATED APPLICATIONS

This application is a continuation application of U.S. Non-Provisional patent application Ser. No. 12/393,450, titled, "Method of Joining a Conference Call", filed Feb. 26, 2009, which claims priority from U.S. Provisional Patent Application No. 61/152,450, filed Feb. 13, 2009, both of which are hereby incorporated herein by reference in their entireties. This application is related to U.S. Provisional Patent Application No. 61/152,473, filed Feb. 13, 2009, the contents of which are incorporated herein by reference.

BACKGROUND

The present application relates to a computer-implemented method of joining a user into a conference call, and more specifically, relates to the provision of a user interface from which a user may easily initiate joining a conference call.

It is common for people to engage in collaborative work. Increasingly, collaboration occurs among people who are geographically separated from one another. When collaborators desire to meet, they may all physically converge in one location for a meeting. Alternatively, and as is more typical nowadays, collaborators may remain at their respective geographic locations but instead meet via conference call.

The ability to meet via conference call has been made possible by the provision of conference call systems by telephony service providers. A subscriber to such a conference call system may, in exchange for payment of a subscription fee, host conference calls. In particular, the service provider may provide the host subscriber a telephone number. The host, who is sometimes also referred to as the "moderator", may then give that phone number, i.e. the "dial-in number", to desired participants in the conference call. Each participant, including the host, may call the dial-in number at the designated meeting time, i.e. each participant may "dial-in" to the conference call. The conference call system may then "bridge" or link the callers' phone lines together, joining all participants into the conference.

Alternatively, instead of subscribing to a conference call system maintained by a third party telephony service provider, certain organizations may have their own conference call system. These private conference call systems may function similarly.

In addition to the dial-in phone number, conference call systems often include the capability for the host to set a security code. The host may give the security code, for example for a given conference call event, to each desired participant in the conference in addition to the dial-in number. Subsequent to dialing the dial-in number and being connected to the conference call system, each participant may be prompted to enter the security code. Only after entering the correct security code will a participant be placed into the conference. While the security code is optional, many people/organizations choose to use one since dial-in numbers may be distributed widely and may therefore become widely known. Requiring that a security code be entered helps ensures that only those people with the code can successfully join the conference.

A participant desiring to join a conference call must therefore dial first a multi-digit telephone number followed by a multi-digit security code. This requirement presents at least two difficulties. First, since the participant is unlikely to remember the required sequence of digits, he or she needs to record them upon receipt, for example, from the host, such that he or she is able to later retrieve those digits at the designated meeting time. Secondly, even after retrieving the digits, the user must typically subsequently enter them into the telephone in order to be successfully connected and placed into the conference call. Given the many digits that the user must enter, the user is prone to mis-dialing the dial-in number and incorrectly entering the security code.

There therefore exists a need to more easily enable a user to join a conference call.

BRIEF DESCRIPTION OF THE DRAWINGS

Reference will now be made, by way of example, to the accompanying drawings which show example embodiments of the present application, and in which:

FIGS. 9A to 9F are screenshots depicting an operation of the mobile communications device of FIG. 8;

FIG. 12 is a screenshot depicting yet another operation of the mobile communications device of FIG. 8;

Similar reference numerals may have been used in different figures to denote similar components.

DESCRIPTION OF EXAMPLE EMBODIMENTS

Figure 1:
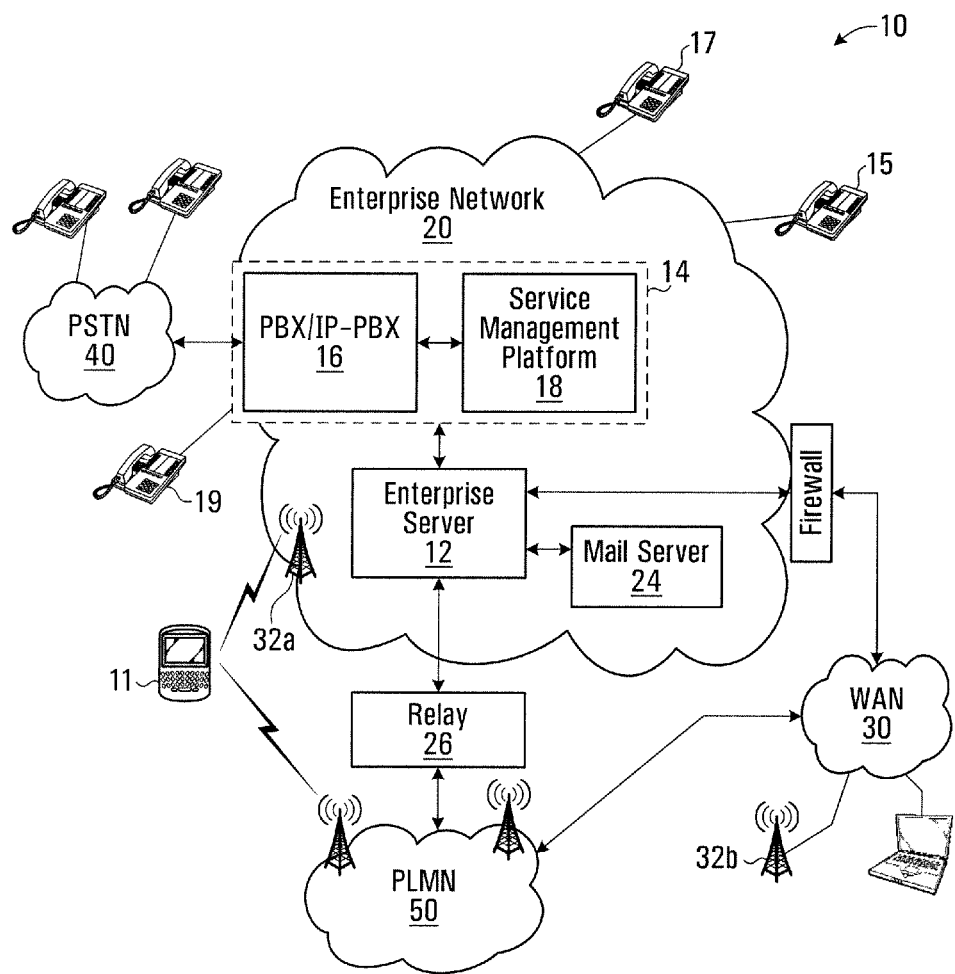
FIG. 1 shows, in block diagram form, an example system for managing enterprise-related mobile calls, including an enterprise communications platform.

In one aspect, a computer-implemented method of joining a user to a conference call event is provided wherein an interface associated with a time management software application is displayed. The interface displays information relating to the conference call event including a date for a conference call which is subject of the conference call event and a start time of the conference call. While displaying the interface, a menu offering one or more options is displayed; these one or more options include an option to join the conference call. When an indication of a selection of the option to join the conference call is received, information associated with the conference call is located; this information includes a telephone number for a conference call bridge. A connection with the conference call bridge using the telephone number is initiated.

In another aspect, a computer-implemented method of joining a user to a conference call event is provided wherein an interface associated with a calendar application is displayed. The calendar application displays information relating to the conference call event including a start time and an end time of a conference call which is subject of the conference call event. Upon receiving an indication of a selection of the conference call event, the interface displays a menu offering one or more options; these one or more options include an option to join the conference call. Upon receiving an indication of a selection of the option to join the conference call, information associated with the conference call is located; this information includes a telephone number for a conference call bridge. A connection with the conference call bridge using the telephone number is initiated.

In yet another aspect, a computer-implemented method of joining a user to a conference call event is provided wherein at a pre-determined time in advance of a start time associated with a conference call event, a display of (i) a reminder window displaying information relating to the conference call event and (ii) a menu offering one or more options available are simultaneously initiated. These one or more options include an option to join the conference call. Upon receipt of an indication of a selection of the option to join the conference call, information associated with the conference call is located; this information includes a telephone number for a conference call bridge. A connection with the conference call bridge using the telephone number is initiated.

In yet another aspect, a computer-implemented method of joining a user to a conference call event is provided wherein a user interface associated with a time management software application is displayed. The user interface displays information relating to the conference call event including a date for a conference call which is subject of the conference call event and a start time of the conference call. While displaying the user interface, a menu offering one or more options available to the user is displayed; these one or more options include an option to join the conference call. If the user selects the option to join the conference call, information, including a dial-in telephone number, is located associated with the conference call and dialing of the dial-in telephone number is initiated.

Mobile communications devices adapted to implement the methods are also provided.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, COMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls. However, the PBX may also facilitate packet-switched calls carried out with terminal devices outside the enterprise.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoiP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APis), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
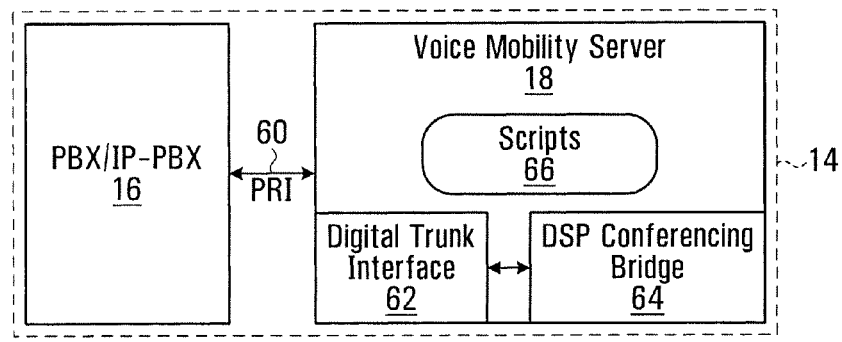
FIG. 2 shows, in block diagram form, further details of an embodiment of the enterprise communications platform.
Figure 3:
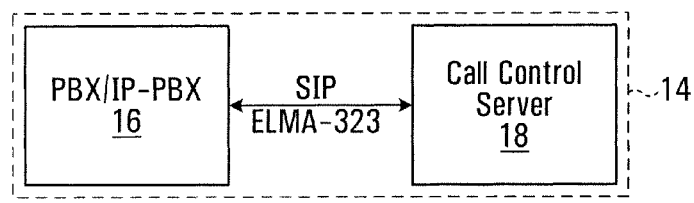
FIG. 3 shows another embodiment of the enterprise communications platform.
Figure 4:
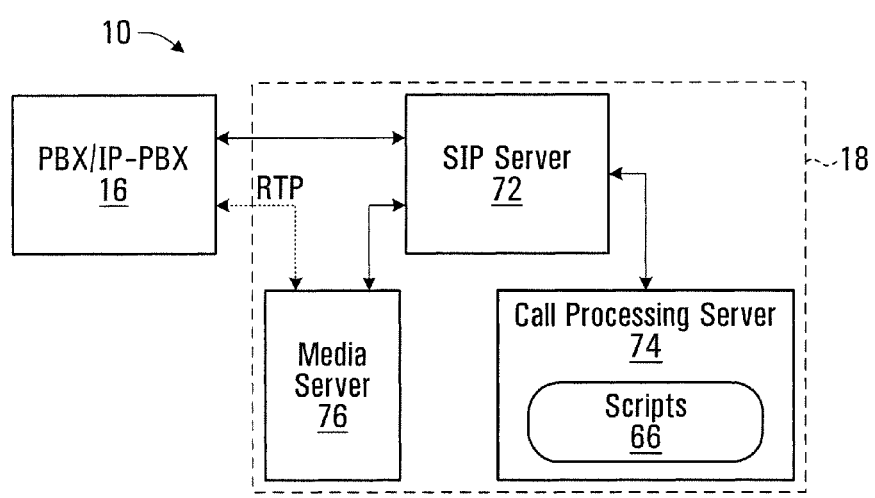
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
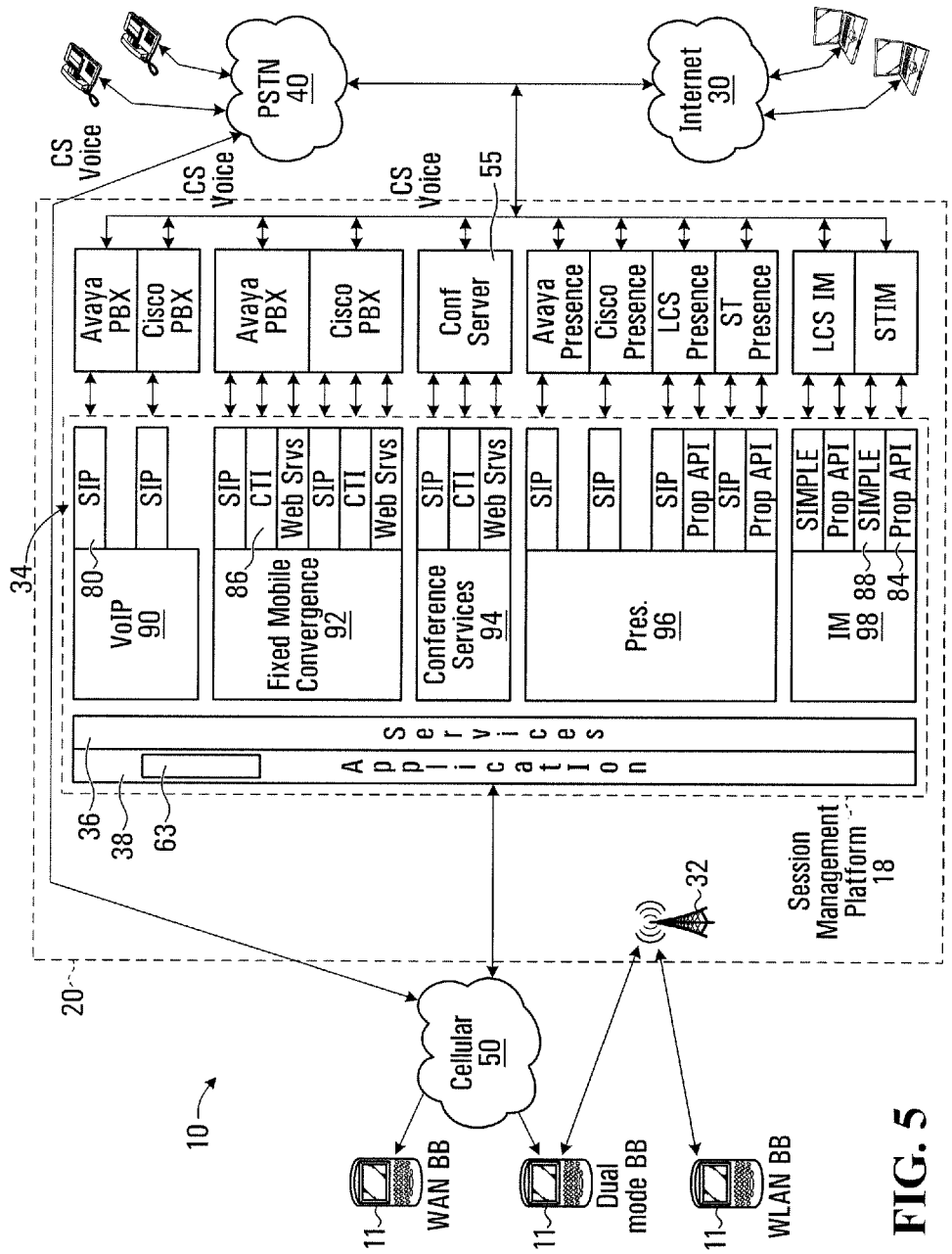
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoiP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoiP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Turning now to FIGS. 6A through 7B, the general operation of the system 10 using SIP 80 as the signaling protocol will be discussed, although it is recognized that the present system is not limited to the processes discussed herein. The signaling descriptions that follow are based on Third Party Call Control architecture, such as that illustrated in FIG. 3 or 5. It will be appreciated that similar but slightly modified signaling may be used in a First Party Call Control architecture, wherein the PBX 16 will pass media through to the SMP 18 for direct media handling by the SMP 18. Variations in the signaling to adapt to various architectures will be appreciated by those ordinarily skilled in the art.

Figure 6A:
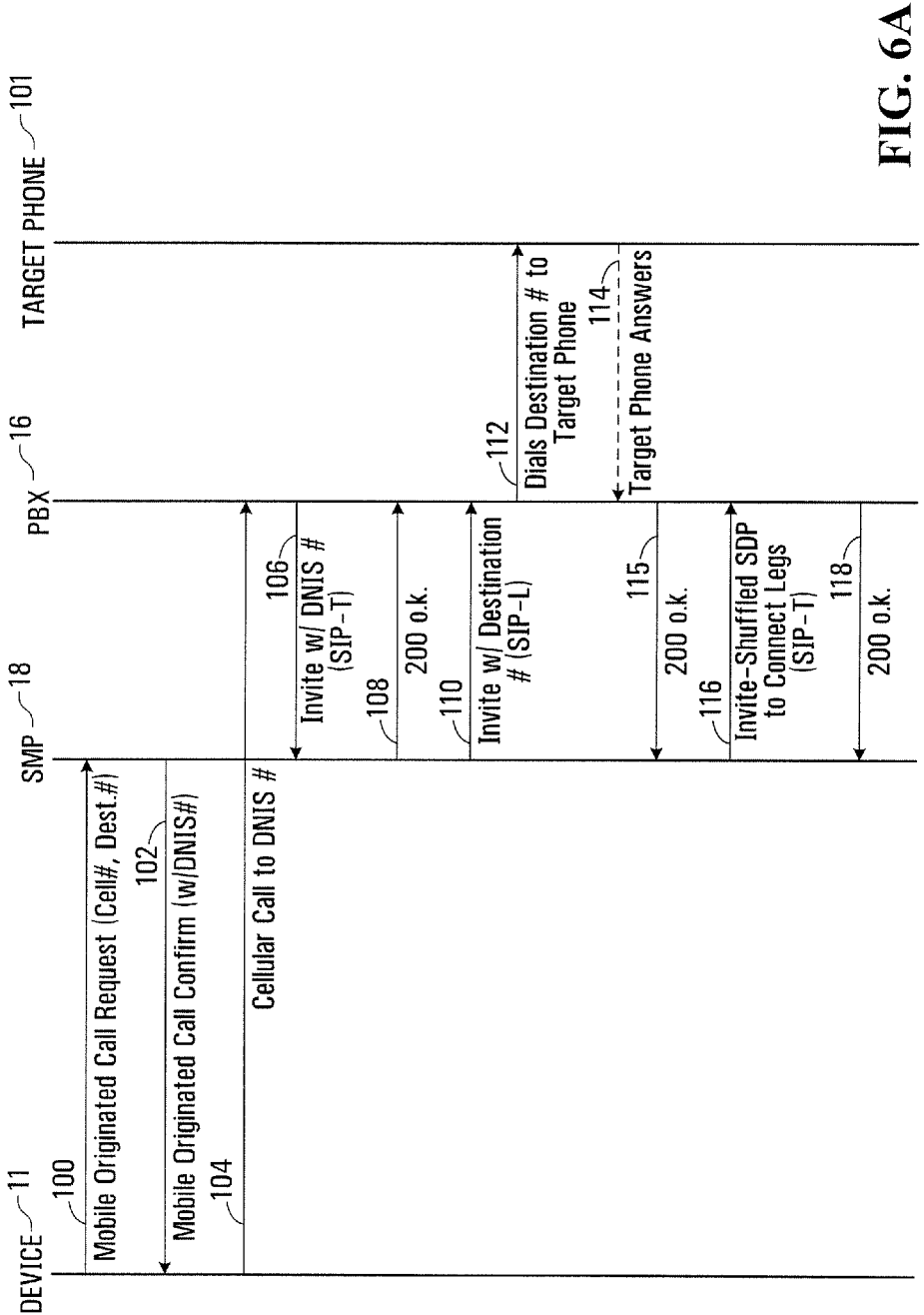
FIG. 6A is a signaling diagram generally indicating how mobile-originated, mobile-initiated calls are processed by the network of FIG. 5.

FIG. 6A provides a signaling diagram for a call originating from one of the mobile devices 11 to a target phone 101 connected to a Private Branch Exchange Server or PBX 16 provided within the enterprise network 20. First, the device 11 sends a mobile originated call request with its cellular number and the destination number of the target phone 101 to the SMP 18 (block 100). In some embodiments, the mobile originated call request may be sent via the WLAN through the enterprise server 12. In another embodiment, the call request may be sent via the PLMN/PSTN through the PBX 16, for example as an SMS message or using another messaging operation. The SMP 18 confirms the call request by sending the DNIS number to the device 11 (block 102). Next, the device 11 makes a cellular call using the DNIS number, which is received by the PBX 16 (block 104). As the DNIS has been configured in the PBX 16 to be routed to the SMP 18 via SIP-T, in response to the incoming call, the PBX 16 sends an invite over SIP-T with the DNIS number to the SMP 18 (block 106). The SMP 18 matches the incoming call with the expected call from the mobile, and if correct, acknowledges the invite by sending a 200 OK signal to the PBX 16, indicating that the mobile call leg is established (block 108).

The SMP 18 then sets up the outgoing call leg to the destination. It does this by sending an invite over SIP-L to the PBX 16 with the destination number of the target phone (block 110). SIP-L is used so that the call can be correctly attributed to the individual within the organization within any call records that are being maintained by the PBX 16. When the invite is received, the PBX 16 dials the destination number to the target phone 101 (block 112), and the target phone 101 answers the call (block 114). When the target phone 101 is answered, the PBX 16 sends a 200 OK signal to the SMP 18 indicating that the target phone 101 is ready to receive data (block 115). The SMP 18 then sends an invite over SIP-T to the PBX 16 and shuffles the SOP (Session Description Protocol, as known to those of ordinary skill in the art) to connect the call legs (block 116). When the call legs are connected, the PBX 16 sends a second 200 OK signal to the SMP 18 (block 118), and the users of the device 11 and target phone 101 can communicate with each other.

Note that between the cellular call leg being established and the outgoing call leg being answered, the mobile user hears ringing tones. These ringing tones may be provided by the PBX 16 using the presentation of early media from the outgoing call leg, or they may be generated locally on the device 11 if early media is not available. In the latter case, it will be necessary to localize the ringing tone to match the tone normally heard with a call through the PBX 16.

Figure 6B:
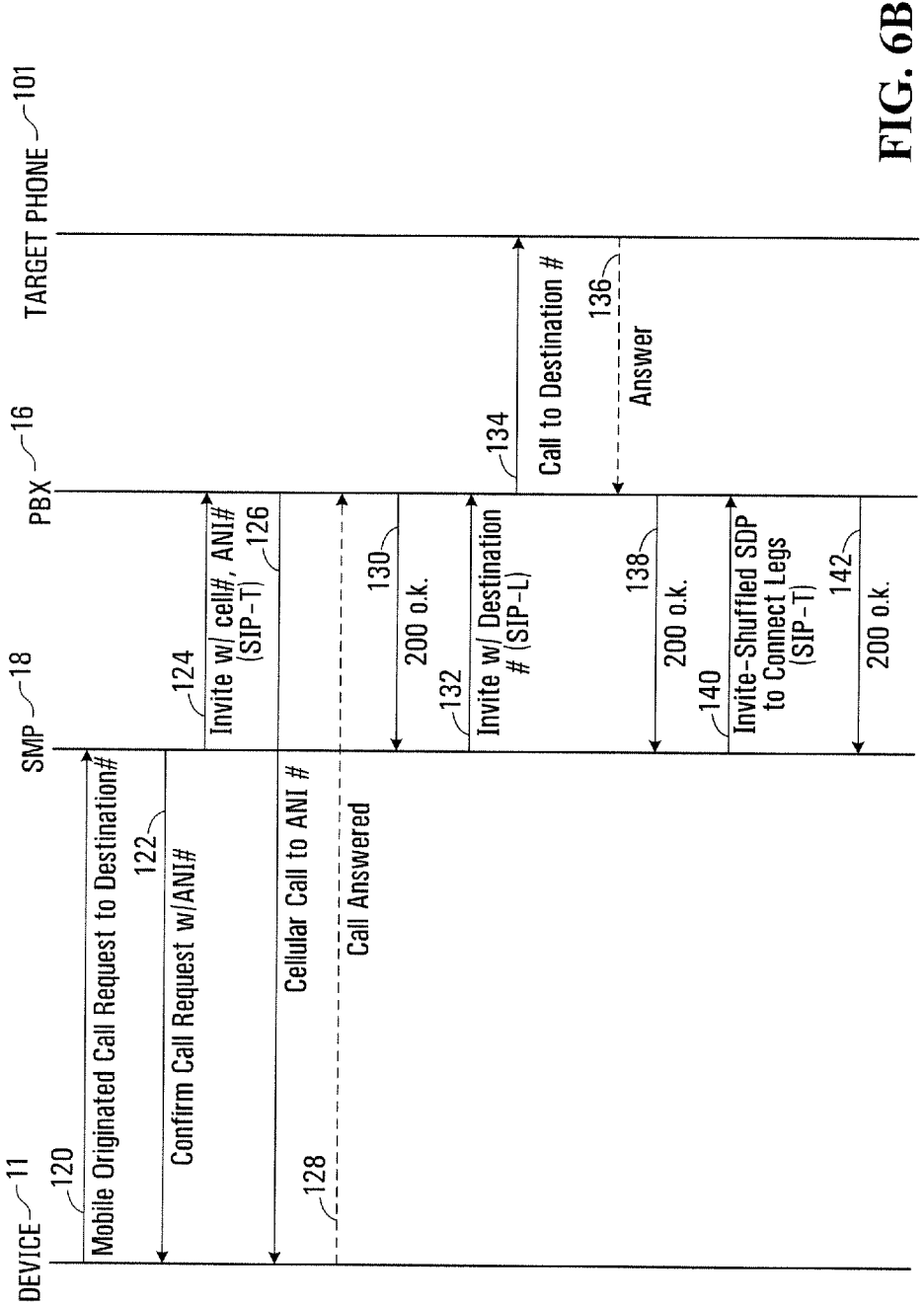
FIG. 6B is a signaling diagram generally indicating how mobile-originated, PBX-initiated, calls are processed by the network of FIG. 5.

The above description is known as a "mobile initiated" call, because the SMP 18 provides the mobile device 11 with the DNIS number into which the mobile device 11 has called. Alternatively, the mobile originated call could be "PBX initiated", as shown in FIG. 6B. Specifically, in a PBX-initiated call, upon receipt of the mobile originated call request (block 120), the SMP 18 confirms receipt of the call to the mobile device 11 with an ANI number (block 122), which the mobile device uses to identify the incoming call from the PBX 16. The PBX 16 then sends an invite over SIP-T to the PBX 16 with the cellular number of the device and the ANI number that is attached to the outgoing call (block 124). Upon receipt of the invite, the PBX 16 makes a cellular call to the device 11 (block 126), which is answered by the device (block 128). The device 11 checks the ANI number in the incoming call to confirm if the number is actually from the PBX 16. If the ANI number is stripped for any particular reason, then the device 11 may be configured to answer the call as a regular cellular call, or it may reject the call as unknown. When the device 11 answers the PBX-initiated call, the PBX 16 sends a 200 OK signal to the SMP 18, indicating that the call leg to the device is established (block 130).

In response, the SMP 18 sends an invite over SIP-L with the destination number of the target phone 101 to the PBX 16 (block 132). When the invite is received at the PBX 16, the PBX dials the destination number to the target phone 101 (block 134), the target phone 101 picks up the call (block 136), and a 200 OK signal is sent from the PBX 16 to the SMP 18 (block 138), indicating that the target phone 101 is also ready to receive data. In response to the 200 OK, the SMP 18 sends an invite to the PBX 16, shuffling the SDP to connect the call legs (block 140). Finally, when the call legs are connected, the PBX 16 sends a second 200 OK signal to the SMP 18, and the users of the device 11 and target phone 101 are able to communicate with each other.

In both instances, the SMP 18 is performing third party call control of the two call legs, the PBX 16 remaining in control of the call. The decision of whether to proceed with a mobile-initiated call or a PBX-initiated call can be set by policy. Specifically, the option to select either mobile-initiated or PBX-initiated calls is a feature provided in the SMP 18, and an administrator for the enterprise network 20 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 7A:
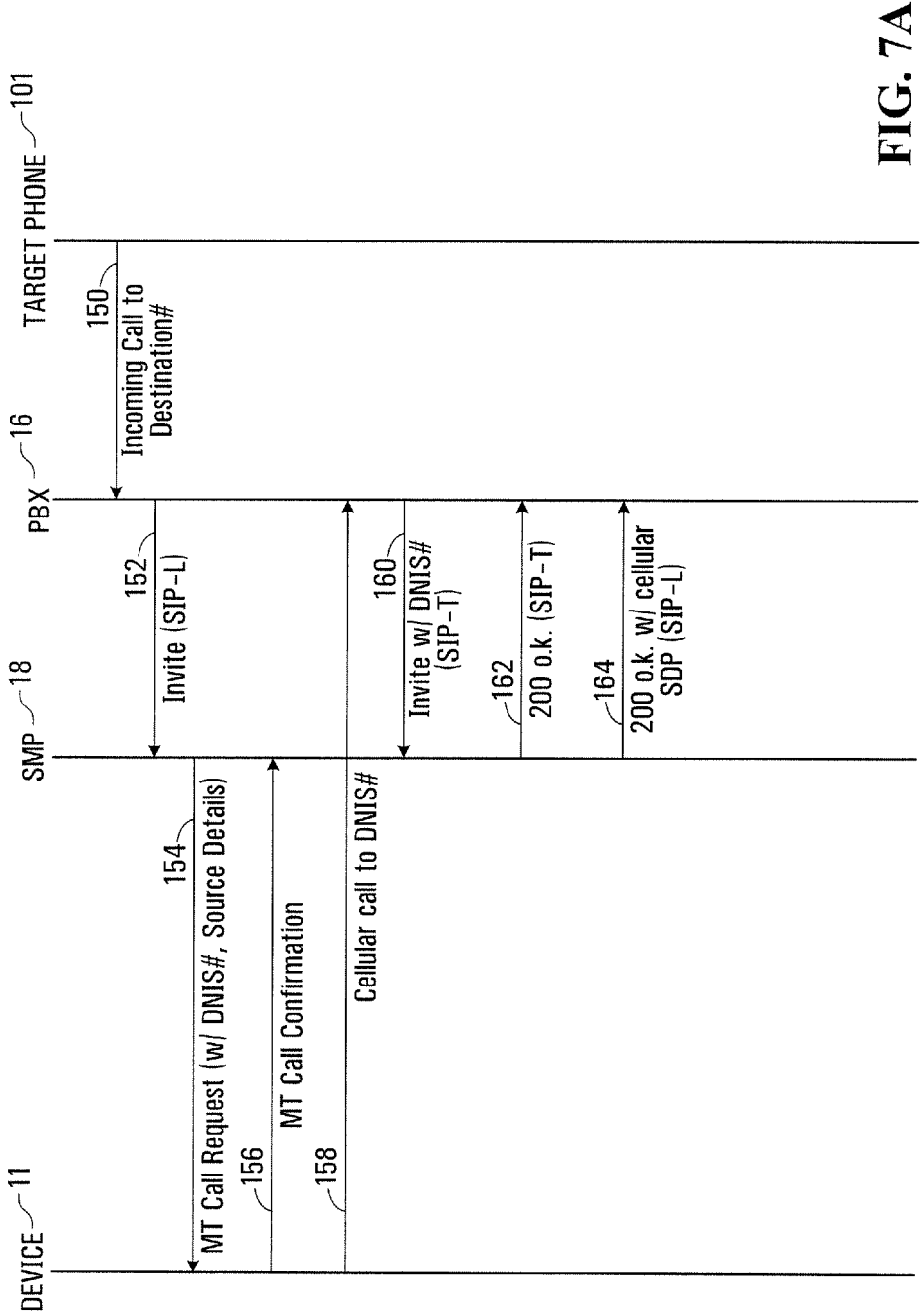
FIG. 7A is a signaling diagram generally indicating how mobile-terminated, mobile-initiated calls are processed by the network of FIG. 5.
Figure 7B:
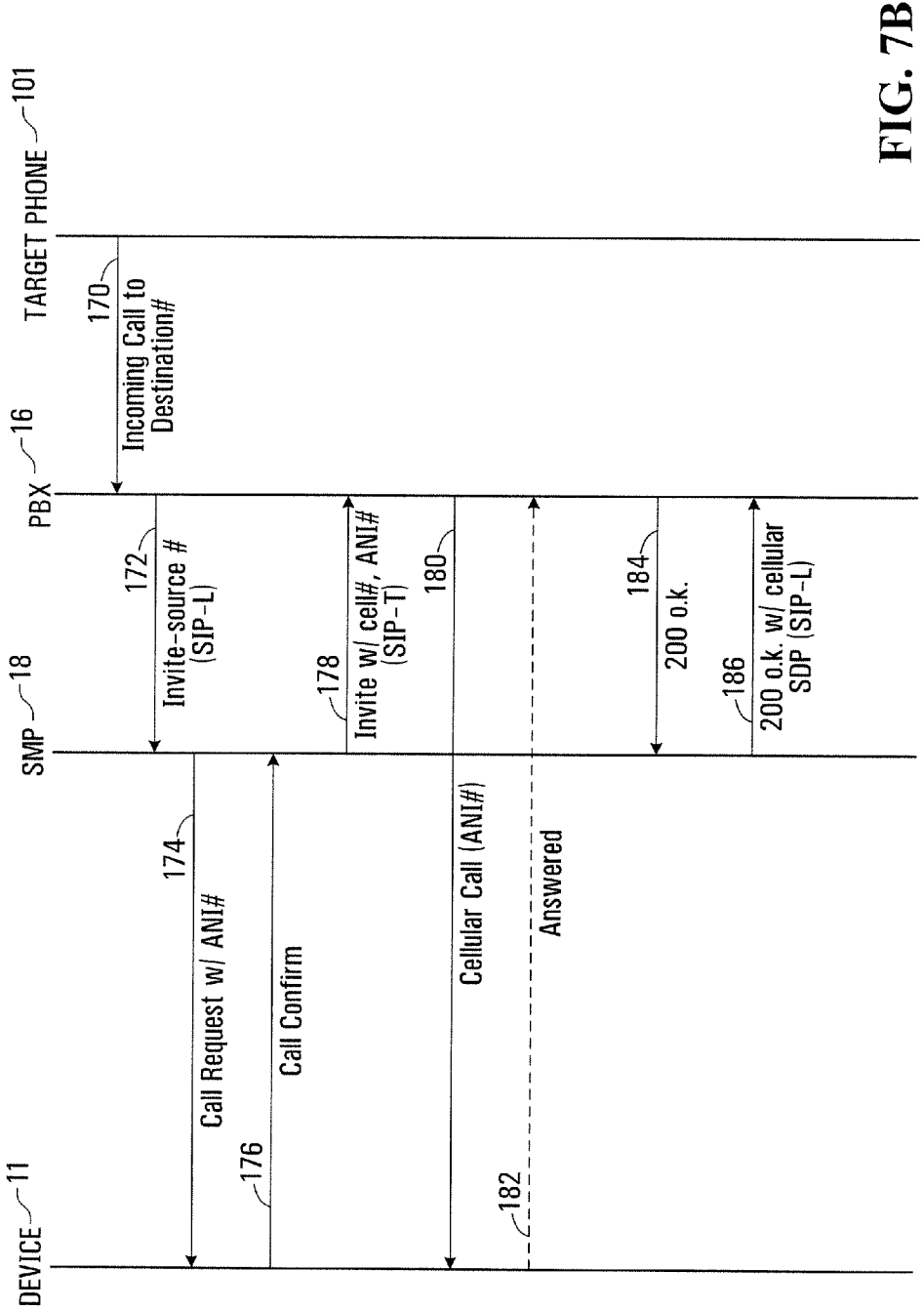
FIG. 7B is a signaling diagram generally indicating how mobile-terminated, PBX-initiated calls are processed by the network of FIG. 5.

FIGS. 7A and 7B are signaling diagrams illustrating a mobile terminated call utilizing SIP 80. Specifically, and for the purposes of this disclosure, the target phone 101 is originating the call, which will send a call to the mobile device. Turning first to FIG. 7A, an incoming call is made from the target phone 101 to the PBX 16 (block 150). When the call is received at the PBX 16, the PBX 16 sends an invite to the SMP 18 over SIP-L (block 152).

In response to the invite, the SMP 18 sends a call request with the DNIS number and source details to the device 11 (block 154), which is confirmed to the SMP (block 156). In addition to confirming the call, the mobile device 11 sends a cellular call to the DNIS number at the PBX 16 (block 158). Again, as the DNIS number is routed in the dialing plans to the SMP 18, upon receipt of the cellular call, the PBX 16 sends an invite over SIP-T to the SMP 18 with the DNIS number (block 160). In response to the invite, a "200 OK" signal is sent over SIP-T from the SMP 18 to the PBX 16, acknowledging that the call leg to the mobile device 11 is established (block 162). Finally, the initial invite (block 152) is acknowledged with the "200 OK" signal with the cellular SDP (block 164), at which point the call legs are joined and the target phone 101 and device 11 can communicate with each other on the call.

The diagram shown in FIG. 7A illustrates a "mobile-initiated" call, because, as discussed above with respect to FIGS. 6A and 6B, the SMP 18 presents the mobile device 11 with the ON IS number at the PBX 16 into which to call. However, it is also possible to employ a "PBX-initiated" mobile terminated call, as shown in FIG. 7B, where the PBX 16 sends an incoming call to the device 11 with the ANI number of the target phone 101.

Specifically, similar to the mobile initiated call described above and shown in FIG. 7A, the target phone 101 sends an incoming call to the destination number of the device, which is received at the PBX 16 (block 170). Upon receipt of the call, the PBX 16 sends an invite over SIP-L to the SMP 18 (block 172) with the source number of the target phone 101. In response to the invite, the SMP 18 sends a call request with the source number to the device 11 (block 174), with the ANI number the device should expect in the incoming call, the call request being confirmed by the device (block 176). At this point in the PBX-initiated call, the SMP 18 sends an invite over SIP-T to the PBX 16 with the cellular number and ANI number to use (block 178), prompting the PBX 16 to make a cellular call to the device 11 with the ANI number (block 180), prompting the device to ring. The device 11 answers the call (block 182), and a "200 OK" signal is sent from the PBX 16 to the SMP 18, acknowledging that the cellular call leg to the device 11 is established (block 184). In response, a "200 OK" signal is also sent from the SMP 18 to the PBX 16, acknowledging that the call leg to the target phone 101 is also established (block 186). The SMP 18 shuffles the SOP to connect the call legs, the call legs are joined, and the target phone 101 and device 11 can communicate with each other on the call.

As discussed above with respect to FIGS. 6A and 6B, the SMP 18 remains in control of the signaling between the target phone 101 and the mobile device 11 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

As described above, mobile device 11 may be used to both initiate and receive calls, including conference calls. Components of exemplary mobile device 11 will next be described in conjunction with FIG. 8.

Figure 8:
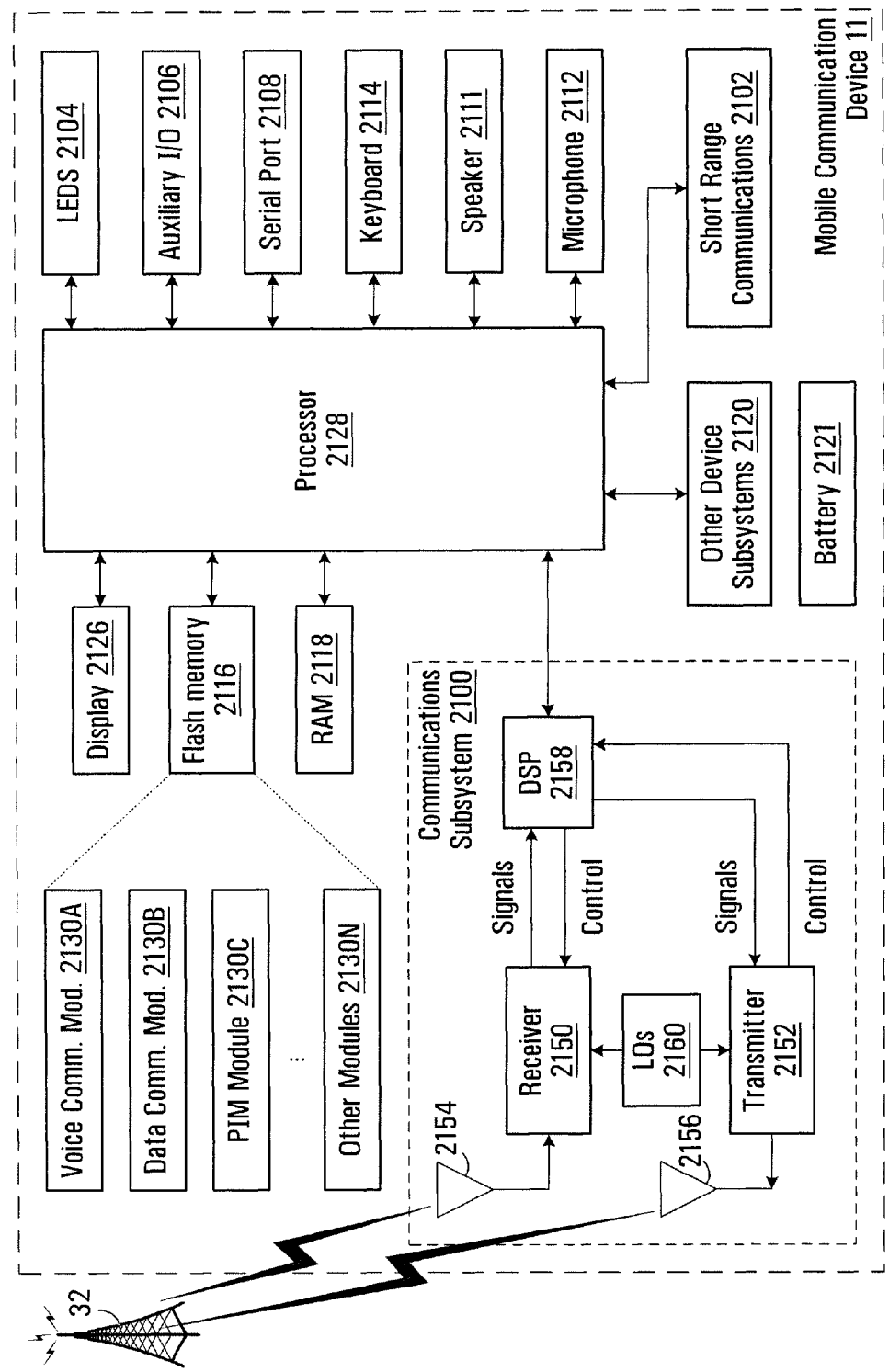
FIG. 8 is a schematic diagram showing selected components of a mobile communications device implementing the disclosed method.

FIG. 8 illustrates mobile device 11 including a housing, an input device (a keyboard 2114), and an output device (a display 2126), which is preferably a full graphic Liquid Crystal Display (LCD). Other types of output devices may alternatively be utilized. A processing device (a microprocessor 2128) is shown schematically in FIG. 8 as coupled between the keyboard 2114 and the display 2126. The microprocessor 2128 controls the operation of the display 2126, as well as the overall operation of the mobile device 11, in response to actuation of keys on the keyboard 2114 by a user.

The housing may be elongated vertically, or may take on other sizes and shapes (including clamshell housing structures). The keyboard may include a mode selection key, or other hardware or software for switching between text entry and telephony entry.

In addition to the microprocessor 2128, other parts of the mobile device 11 are shown schematically in FIG. 8. These include: a communications subsystem 2100; a short-range communications subsystem 2102; the keyboard 2114 and the display 2126, along with other input/output devices including a set of auxiliary I/O devices 2106, a serial port 2108, a speaker 2111 and a microphone 2112; as well as memory devices (which are computer-readable media) including a flash memory 2116 and a Random Access Memory (RAM) 2118; and various other device subsystems 2120. The mobile device 11 may have a battery 2121 to power the active elements of the mobile device 11. The mobile device 11 is preferably a two-way radio frequency (RF) communication device having voice and data communication capabilities. In addition, the mobile device 11 preferably has the capability to communicate with other computer systems via the Internet.

Operating system software executed by the microprocessor 2128 is preferably stored in a persistent store, such as the flash memory 2116, but may be stored in other types of memory devices, such as a read only memory (ROM) or similar storage element. In addition, system software, specific device applications, or parts thereof, may be temporarily loaded into a volatile store, such as the RAM 2118. Communication signals received by the mobile device may also be stored to the RAM 2118.

The microprocessor 2128, in addition to its operating system functions, enables execution of software applications on the mobile device 11. A predetermined set of software applications that control basic device operations, such as a voice communications module 2130A and a data communications module 2130B, may be installed on the mobile device 11 during manufacture. In addition, a personal information manager (PIM) application module 2130C may also be installed on the mobile device 11 during manufacture. The PIM application is preferably capable of organizing and managing data items, such as e-mail, calendar events, voice mails, appointments, and task items. The PIM application is also preferably capable of sending and receiving data items via a wireless network 32. Preferably, the data items managed by the PIM application are seamlessly integrated, synchronized and updated via the wireless network 32 with the device user's corresponding data items stored or associated with a host computer system. As well, additional software modules, illustrated as other software modules 2130N, may be installed during manufacture.

Communication functions, including data and voice communications, are performed through the communication subsystem 2100, and possibly through the short-range communications subsystem 2102. The communication subsystem 2100 includes a receiver 2150, a transmitter 2152 and one or more antennas, illustrated as a receive antenna 2154 and a transmit antenna 2156. In addition, the communication subsystem 2100 also includes a processing module, such as a digital signal processor (DSP) 2158, and local oscillators (LOs) 2160. The specific design and implementation of the communication subsystem 2100 is dependent upon the communication network in which the mobile device 11 is intended to operate. For example, the communication subsystem 2100 of the mobile device 11 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 11.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 11 may send and receive communication signals over the communication network 2110. Signals received from the communication network 2110 by the receive antenna 2154 are routed to the receiver 2150, which provides for signal amplification, frequency down conversion, filtering, channel selection, etc., and may also provide analog to digital conversion. Analog-to-digital conversion of the received signal allows the DSP 2158 to perform more complex communication functions, such as demodulation and decoding. In a similar manner, signals to be transmitted to the network 32 are processed (e.g., modulated and encoded) by the DSP 2158 and are then provided to the transmitter 2152 for digital to analog conversion, frequency up conversion, filtering, amplification and transmission to the communication network 32 (or networks) via the transmit antenna 2156.

In addition to processing communication signals, the DSP 2158 provides for control of the receiver 2150 and the transmitter 2152. For example, gains applied to communication signals in the receiver 2150 and the transmitter 2152 may be adaptively controlled through automatic gain control algorithms implemented in the DSP 2158.

In a data communication mode, a received signal, such as a text message or web page download, is processed by the communication subsystem 2100 and is input to the microprocessor 2128. The received signal is then further processed by the microprocessor 2128 for an output to the display 2126, or alternatively to some other auxiliary I/O devices 2106. A device user may also compose data items, such as e-mail messages, using the keyboard 2114 and/or some other auxiliary I/O device 2106, such as a touchpad, a rocker switch, a trackball, or some other type of input device. The composed data items may then be transmitted over the communication network 32 via the communication subsystem 2100.

In a voice communication mode, overall operation of the device is substantially similar to the data communication mode, except that received signals are output to a speaker 2111, and signals for transmission are generated by a microphone 2112. Alternative voice or audio I/O subsystems, such as a voice message recording subsystem, may also be implemented on the device 11. In addition, the display 2126 may also be utilized in voice communication mode, for example, to display the identity of a calling party, the duration of a voice call, or other voice call related information.

The short-range communications subsystem 2102 enables communication between the mobile device 11 and other proximate systems or devices, which need not necessarily be similar devices. For example, the short-range communications subsystem may include an infrared device and associated circuits and components, or a Bluetooth™ communication module to provide for communication with similarly-enabled systems and devices.

To provide context and background for the disclosed method, the following disclosure begins by first describing the process of creating a conference call request. Next, the process of accepting a conference call request is described. Finally, the process of joining a conference call, which process includes the disclosed method, is described.

By way of background, a host (or moderator) may initiate a conference call meeting in one of several ways. A typical method is for the host to create and send a meeting request addressed to one or more invited participants using a messaging application such as an email application. The moderator may enter in the meeting request a list of invited participants (or "attendees"), the time of the conference call, a dial-in number to the conference call bridge and a security code. Upon receipt of the meeting request, each invited participant may choose to accept, reject or modify the meeting request. Upon accepting the meeting request, an entry associated with the conference call event may be entered into the attendee's electronic calendar.

FIGS. 9A to 9F illustrate how a host/moderator ("the user") may send out a conference call request to one or more desired participants using exemplary mobile device 11. As previously explained, PIM application module 2130C, which is capable of managing data items such as email and calendar events, may be installed on mobile device 11 (FIG. 8). In particular, PIM application module 2130C may include email and calendar applications in conjunction with which the disclosed method may function, as will become apparent.

Figure 9A:
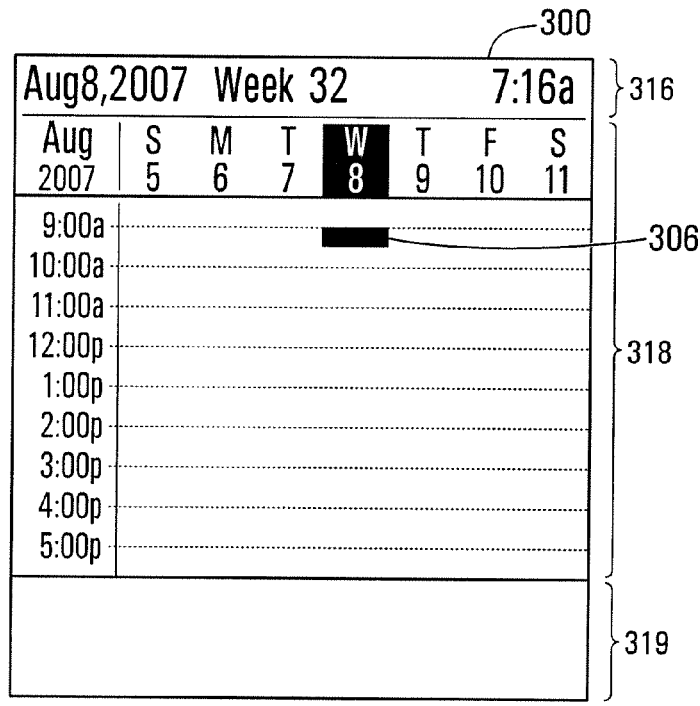
Figure 9B:
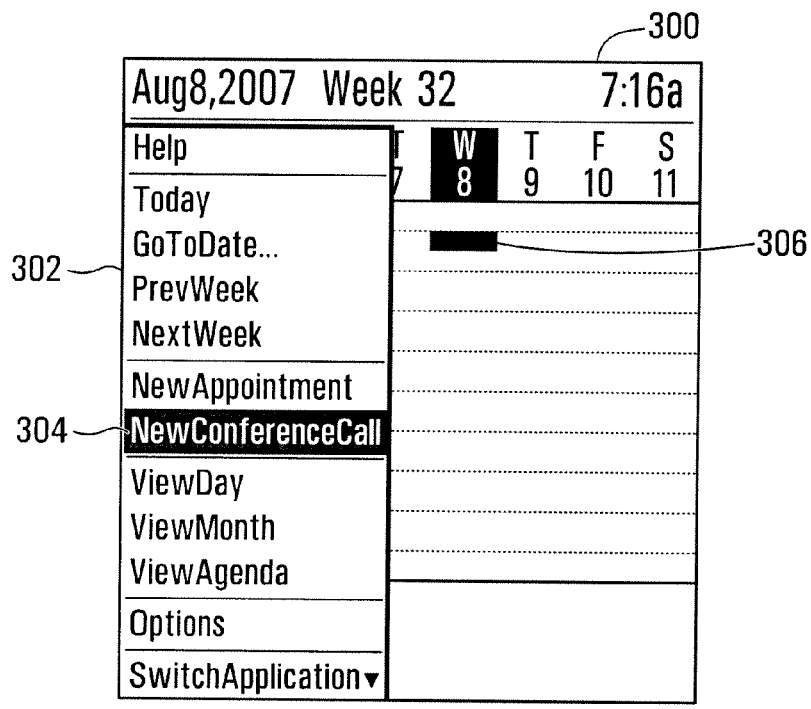

Upon launching the calendar application of PIM module 2130C, the host may be presented with exemplary user interface screen 300 (FIG. 9A) on display 2126. Screen 300 may be divided into a status bar portion 316 and a calendar portion 318. An indication of the current date ("Aug. 8, 2007"), time ("7:16 a") and week of the year ("Week 32") may be displayed in status bar potion 316. Calendar portion 318 may be a grid with the days of the current week displayed along the x-axis and hours of the day on displayed along the y-axis. Such a calendar view may be referred to as a "week view". This is in contrast to a single-day "day view", or a multi-day "agenda view" as will be further discussed below. Additionally, a cursor 306 may be provided as a navigational aid on screen 300 (FIG. 9B). As illustrated, cursor 306 is situated on the 9:00 to 9:30 a timeslot on Wednesday, August 8.

While on screen 300, the host may call up menu 302 by, for example, clicking the trackball (or other auxiliary I/O device 2106) of device 11 (FIG. 9B). Conveniently, menu 302 may contain a plurality of contextual actions (conventionally known as "menu items") available to the host. That is, the actions presented to the host in menu 302 may conveniently be only those that a user would logically be expected to invoke when presented with screen 300. For example, it may be expected that a user would want to show calendar events for the current day ("Today"); view calendar events for a particular date ("Go To Date . . . "); change the calendar view to "day view" ("View Day"), "month view" ("View Month") or "agenda view" ("View Agenda"); create a new appointment entry ("New Appointment"), etc. Notably, the user may also be given the option of creating a new conference call event ("New Conference Call" action 304).

As is well known in the art, the active menu item in menu 302 may be highlighted. For instance, as shown in FIG. 9B, the "New Conference Call" action 304 is the active menu item. A user may navigate up or down menu 302 to highlight other menu items by, for example, scrolling trackball 2106 up or down. To select a menu item, the user may highlight the action then click trackball 2106.

After the host has selected "New Conference Call" item 304 from menu 302, he or she may be presented with screen 320 (FIG. 9C). Title bar 330 identifies screen 320 as associated with the "New Conference Call" action. Screen 320 may include several editable (using one or a combination of keyboard 2114 and I/O device 2106) text fields, including "Subject:" field 331, "Location:" field 332, "Start:" field 334, "End:" field 335, and "Notes:" field 347. Conveniently, and referring back to FIG. 9B, the values of "Start:" field 334 and "End:" field 335 may be automatically set based on the position of cursor 306 at the time the user calls up menu 304.

Notably, the host may also set a value for "Reminder:" field 339 at screen 320. As illustrated, because the value of "Reminder:" field 339 is set to "15 min", a reminder screen (FIG. 15) will pop up on display 2126 of each participant's mobile device 15 minutes before the designated start time of the conference call, in this example, 9:00 am on Aug. 8, 2007. Of course, the host could change the value of "Reminder:" field 339 to another time preceding the designated start time in a conventional manner (e.g. by typing another value in or picking another value from a pick list).

Figure 9E:
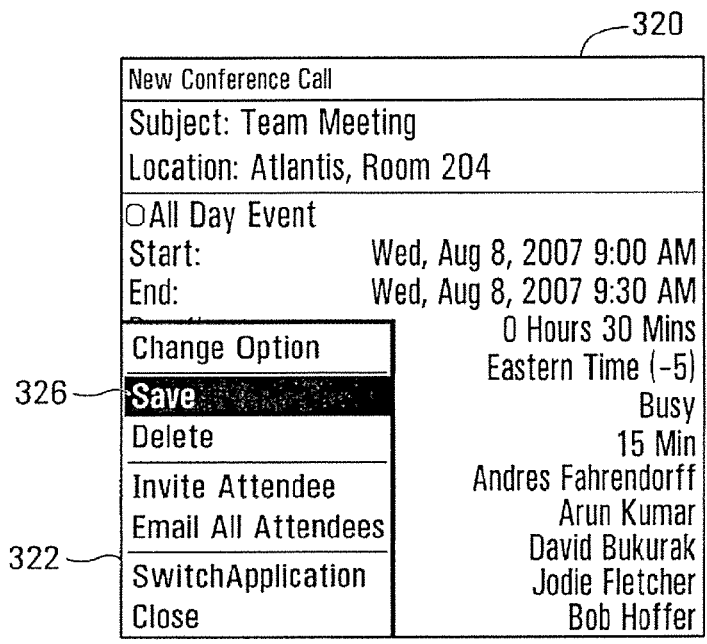
Figure 9F:
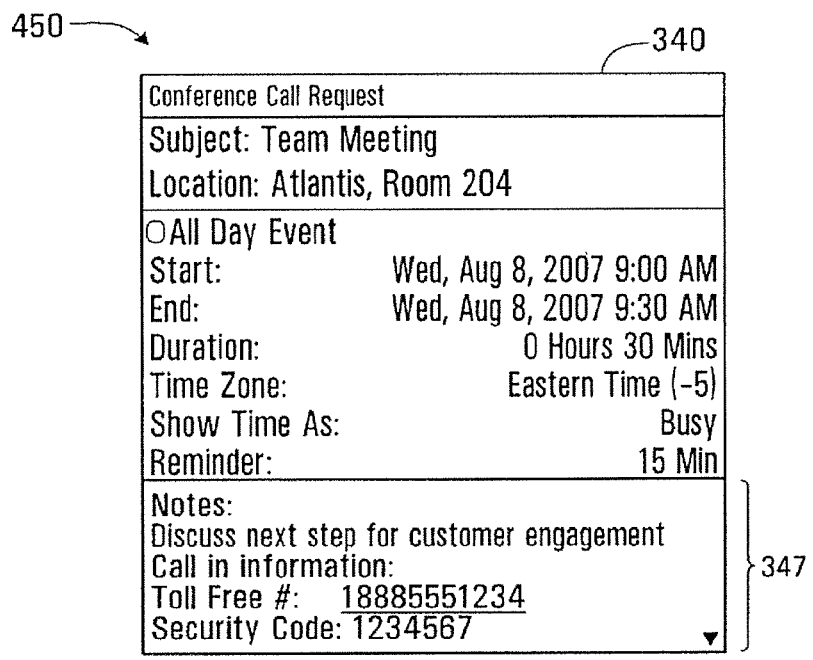

The host may, using keyboard 2114, enter text in "Subject::" field 331, "Location:" field 332, and "Notes:" field 347 (see FIGS. 9E and 9F). In the "Notes:" field, the host may type in free-form text, including, for example, a description of the purpose of the conference call, and call-information, such as the dial-in number for the conference bridge (e.g. conference bridge 64). More specifically, as illustrated in FIG. 9F, the host has typed the following text into "Notes:" field 347; "Discuss next steps for customer engagement." and has provided dial-in information consisting of a toll-free dial-in number to the conference bridge ("1 888 555 1234"), e.g. conference bridge 64, and a security code ("1234567"). As will be further detailed below, the conference bridge dial-in number may be underlined, indicating that it is actionable text.

To invite participants to the conference call, the host may click trackball 2106 on screen 320 (FIG. 9C) to call up menu 322, as shown in FIG. 9D. Menu 322 includes an "Invite Attendee" item 324. After selecting the "Invite Attendee" item 324, the host may be taken to an address book, also part of PIM application module 2130C. The host may then select one or more contacts in the address book in a conventional manner (not shown). Alternatively, the host may be presented with a text field into which he or she may type the email address(es) of one or more attendees also in a conventional manner (not shown).

Once all desired attendees have been added, the host may scroll up to, and select, the "Save" item 326 on menu 322 (see FIG. 9E). The completed conference call request 450 (screen 340) is shown in FIG. 9F (note that the list of all invited attendees is not shown in exemplary screen 340). Conference call request 450 is thereafter sent via email, for example, over wireless network 32, to each invited attendee.

The function of fields 333, 336, 337, 338, 345, and 346 are beyond the scope of this disclosure, and therefore will not be discussed. However, their uses should be apparent to those of ordinary skill in the art.

Instead of the host creating a conference call request using the "New Conference Call" menu item, as described above, as may be appreciated by one of ordinary skill in the art, an existing meeting calendar item may be converted into a conference call meeting by filling in the fields specific to a conference call meeting (e.g. call-in details).

Figure 10:
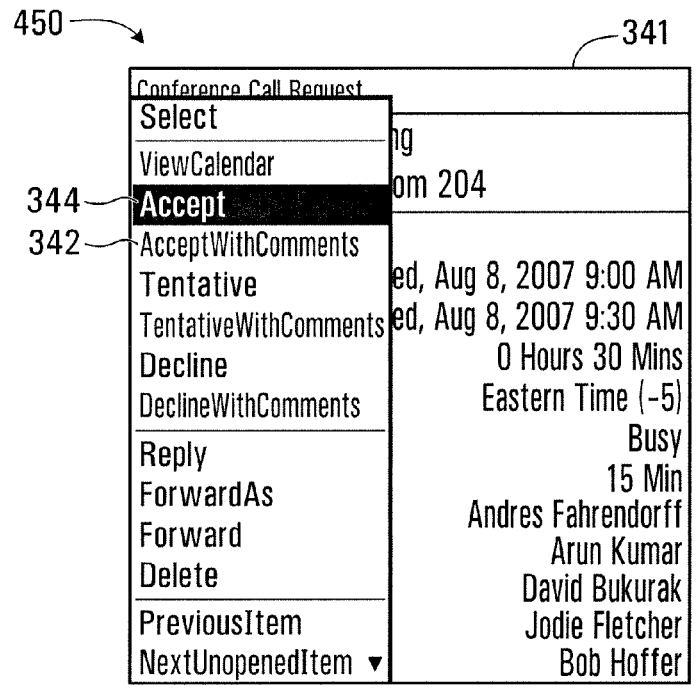
FIG. 10 is a screenshot depicting yet another operation of the mobile communications device of FIG. 8.

FIG. 10 is a screenshot of exemplary screen 341 that is displayed to a recipient of the conference call request 450. The recipient may receive conference call request 450 as an email on his or her mobile device 11' (not shown). Mobile device 11' may be identical to or may contain the same functional components as previously described mobile device 11.

The recipient may open the email in a conventional manner and be presented with screen 341. Next, the recipient may click on screen 341, using for example, trackball 2106, to call up menu 342. Like menu 322, menu 342 may contain a plurality of contextual menu items, including the active highlighted "Accept:" item 344. To accept conference call request 450, the recipient may select "Accept:" item 344 by clicking trackball 2106. When the recipient accepts conference call request 450, an entry associated with the conference call event may be entered into his or her electronic calendar.

Figure 11:
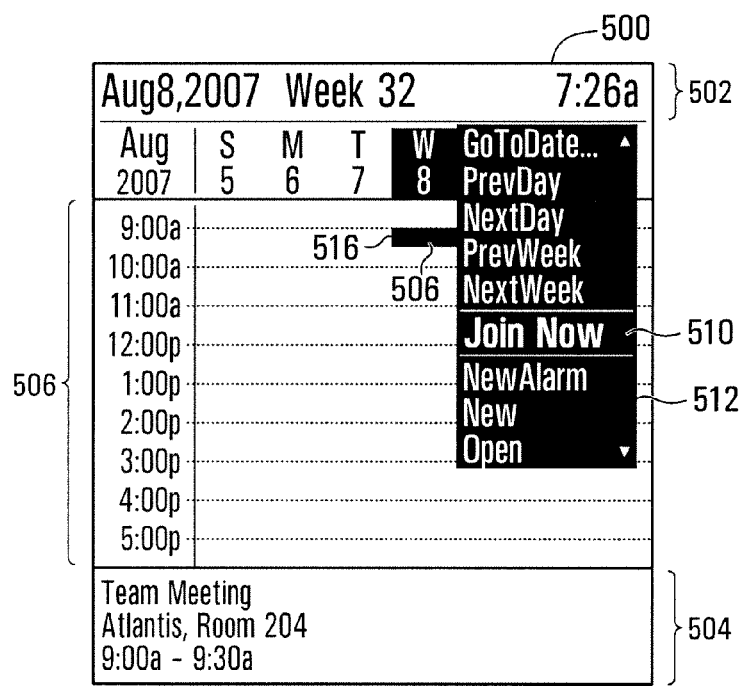
FIG. 11 is a screenshot depicting an aspect of operation of the disclosed method.

FIG. 11 is a screenshot of the recipient's calendar. It may be noted that user interface screen 500 is the same as user interface screen 300 (FIG. 9A), except with different data displayed. Specifically, title bar 502 of screen 500, like title bar 316 of screen 300, displays the current date, week of the year and time. Portion 506 of the screen 500 is also a calendar "week view" like portion 318 of screen 300, except that screen 500 displays the recipient's calendar whereas screen 300 displays the host's calendar.

Once the recipient accepts conference call request 450, bar 516, associated with conference call request 450, is added to the recipient's calendar. (Once the recipient has accepted conference call request 450, he or she will hereinafter be referred to as an "attendee".) Specifically, bar 516 indicates that the 9:00-9:30 a timeslot on Wednesday, August 8 is filled, i.e. the attendee has a scheduled event, in this example, a conference call.

As illustrated, cursor 506 is situated on bar 516. When in this configuration (i.e. when a user is "mouse-ing over" bar 516), some information about the event associated with bar 516 may be displayed in information panel 504. It may be observed that information panel 504 merely displays the subject, location and time of the conference call event, however, does not display detailed information including information contained in the "Notes:" field. To remedy this, the attendee may call up screen 350, entitled "Conference Call Details" (FIG. 12), by clicking on bar 516.

At or prior to the designated meeting time, each attendee, including the host/moderator, dials in to the conference bridge. As previously discussed, an attendee may not recall the dial-in number and security code from memory. This is especially likely to be so when the attendee attends many different conference calls each with different dial-in numbers and security codes. Consequently, conventionally, at the designated meeting time, to obtain the necessary dial-in information and security code, an attendee would call up his or her calendar on his or her mobile device 11' and select the user interface component associated with the conference call event (in this example, bar 516) to bring up Conference Call Details screen 350.

After retrieving the dial-in number and security code from the Conference Call Details screen 350, the attendee would conventionally then manually dial the dial-in number. After connecting to the conference bridge, the attendee would manually enter the security code when prompted to do so. In certain embodiments of mobile device 11/11', short-cuts may be available to relieve the user from having to manually dial the dial-in number. For instance, the dial-in number stored in the "Notes:" field, may be converted to actionable text such that, for example, clicking on the dial-in number brings up a menu. This menu may include a "Dial [phone number]" menu item. The "[Phone number]" portion would be automatically filled in by mobile device 11/11'. Referring to FIG. 12, rather than the attendee manually dialing each digit, the attendee, could instead, for example, click on the "1 888 555 1234" text in the "Notes:" field. He or she may then be presented with a menu that includes a "Dial 1 888 555 1234" menu item (not shown). A similar short-cut may be available to relieve the user from having to manually enter each digit of the security code.

Regardless of whether the attendee manually enters each digit of the dial-in number and/or security code, conventionally, the attendee must first call up his or her calendar, select the user interface component associated with the conference call event, call up a detailed view of the conference call event to retrieve the dial-in number and security code, initiate dialing of the dial-in number and then finally enter the security code. Only if the attendee perfectly enters the dial-in number and/or security code will he or she be put into the conference. Clearly, shortening this multi-step process is desirable. A shorter process may not only reduce the likelihood of user-error but may also save time since the user need not commence the sequence of actions needed to join the conference as far in advance of the designated meeting time.

To this end, and in accordance with the disclosed method, with reference to FIG. 11 and flow diagram 1600 (FIG. 16), a "Join Now" menu item 510 may be included in the list of contextual menu items in menu 512. With the inclusion of the "Join Now" menu item 510 in menu 512, an attendee may more quickly join the conference call by calling up his or her calendar, navigating to the user interface component associated with the conference call event, i.e. bar 516, clicking on bar 516 to bring up menu 512, and selecting the "Join Now" menu item 510 (S1602). Thereafter, device 11/11' locates the stored information associated with the conference call (S1604) (e.g. in a database), i.e. the dial-in number to the conference call bridge and security code, and initiates connection with the conference call bridge in the manner described above in conjunction with FIGS. 6A and 68: first dialing the conference call dial-in telephone number (S1606) and then, after a pause or after recognizing a voice prompt (S1608), entering the security code (S1610). The attendee is then joined into the conference (S1612). As may be readily understood by one of ordinary skill in the art, the database may be stored on mobile device 11/11', for example, in memory 2116 (FIG. 8), or may be stored somewhere on enterprise network 20 and accessed by device 11/11' over wireless network 32 (FIG. 1).

Thus, conveniently, from the attendee's perspective, after selecting "Join Now" menu item 510, he or she is automatically joined into the conference call. In contrast to the conventional method, he or she need not call up a detailed view of the conference call event, locate the dial-in number and security code and then subsequently dial the dial-in numbers and security code.

Figure 13A:
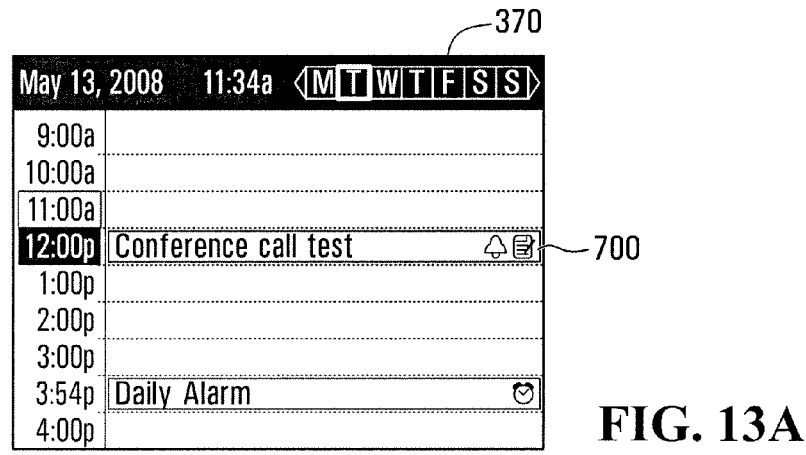
FIGS. 13A and 13B are screenshots depicting operation of a second embodiment of the disclosed method.
Figure 13B:
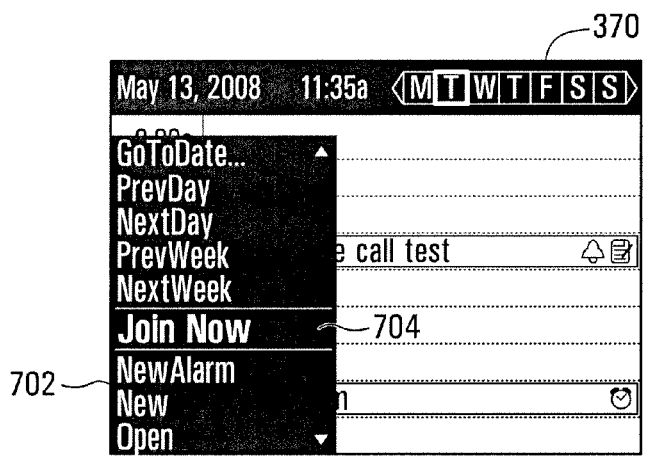

FIGS. 13A and 13B depict a second embodiment of the disclosed method. In particular, FIG. 13A is a screenshot of screen 370 showing an attendee's calendar in "day view". In this example, as indicated by user interface component 700, the attendee has accepted (or created), in the manner previously described, a conference call request, with the subject "Conference call test", scheduled for 12:30-1:30 on Tuesday, May 13, 2008. In accordance with the disclosed method, to join the conference call, the attendee may select user interface component 700, to call up menu 702. Conveniently, menu 702 may also include a "Join Now" menu item 704. Upon selecting "Join Now" menu item 704, the attendee's mobile device locates the information associated with the conference call and initiates dialing of the appropriate telephone number.

Figure 14:
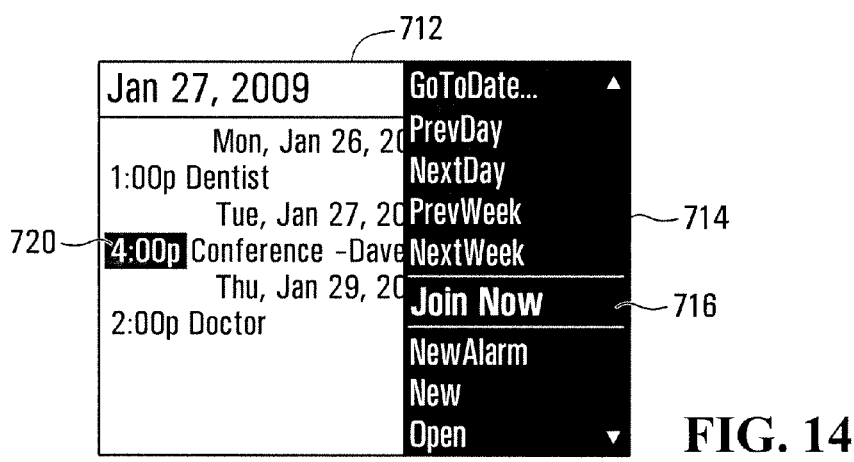
FIG. 14 is a screenshot depicting operation of a third embodiment of the disclosed method.
Figure 16:
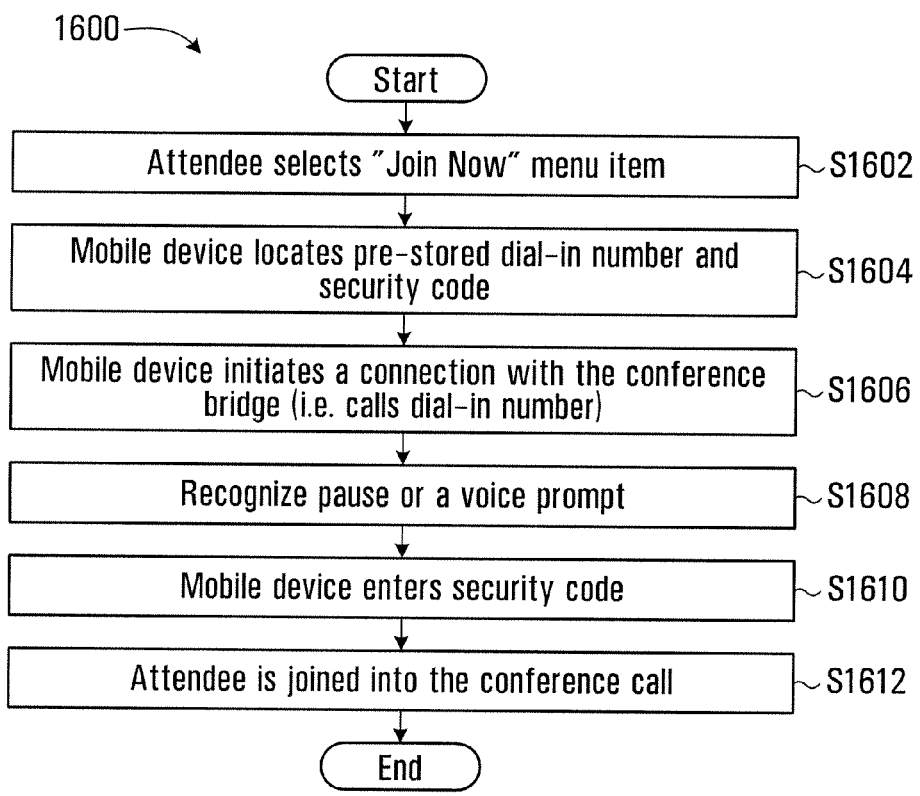
FIG. 16 is a flow diagram depicting operation by a user of the mobile communications device of FIG. 8 in accordance with the disclosed method.

FIG. 14 is a screenshot of a screen 712 of a third embodiment of the disclosed method. Specifically, screen 712 shows an attendee's calendar in "agenda view". As indicated by user interface component 720, this attendee has accepted (or created) a conference call request, with the subject "Conference-Dave", at 4:00 pm on Jan. 27, 2009. Again, in accordance with the disclosed method, a "Join Now" menu item 716 is added to menu 714. The attendee may join the conference call at the designated time by simply selecting user interface component 720 to call up menu 714 and then selecting "Join Now" menu item 716. Upon selecting "Join Now" menu item 716, the attendee's mobile device locates the information associated with the conference call and initiates dialing of the appropriate telephone number and entry of the security code at the appropriate time (FIG. 16).

Thus far, the described embodiments allow the user to select a "Join Now" menu item from a menu in various user interfaces associated with a calendar application (i.e. "day view", "agenda view", "week view"). However, the disclosed method is not so limited, as further described below.

Figure 15:
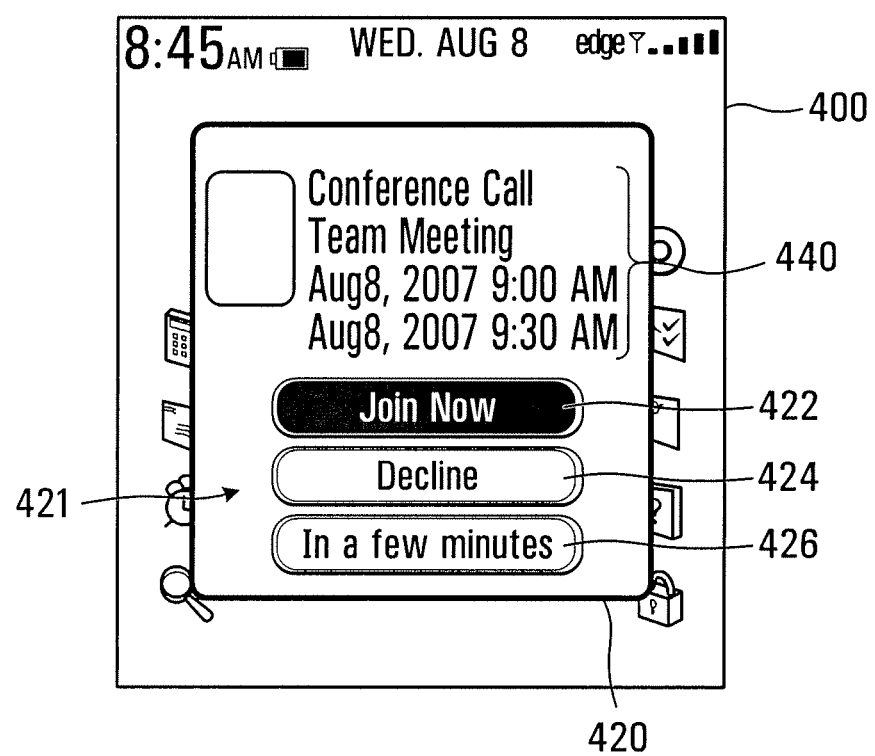
FIG. 15 is a screenshot depicting operation of a fourth embodiment of the disclosed method.

FIG. 15 depicts yet another embodiment of the disclosed method. Referring back to FIG. 9C, as previously described, the host/moderator may populate "Reminder" field 339 with a time value, e.g. 15 min. This has the effect of causing a reminder window 420 (FIG. 15) to pop up on display 2126 15 minutes preceding the time set for the commencement of the conference call. Reminder window 420 may take precedence over any underlying windows such that it is the top-most window displayed on display 2126. This reduces the likelihood that the user will miss the reminder because reminder window 420, is for example, hidden behind other windows. For example, in FIG. 15, desktop screen 400 is a conventional software desktop with a plurality of application icons. At the preconfigured time, reminder window 420 pops up on desktop screen 400.

Reminder window 420 includes text 440 describing the subject of the reminder (i.e., "Conference Call Team Meeting") and time of the event that is the subject of the reminder (i.e., Aug. 8, 2007 9:00 am to Aug. 8, 2007 9:30 am). Conventionally, reminder window 420 may further include buttons which provide a menu 421 of options, specifically, a "Decline" button 424 and "In a few minutes . . . " (often alternatively labeled "Snooze") button 426. As may be understood by those of ordinary skill in the art, selection by the user of "Decline" button 424, using, for example trackball 2106, may have the effect of permanently hiding reminder screen 420. Selection of the "In a few minutes . . . " button 426 may hide reminder screen 420 for a pre-configured period of time, e.g. 5 minutes. Upon expiration of this pre-configured time period, reminder screen 420 may again pop up on display 2126.

In accordance with the present disclosure, "Join Now" button 422, is also included in the menu 421 of options in reminder window 420. "Join Now" button 422 functions in the same manner as previously described "Join Now" menu items 510, 704, and 716, and as previously described in conjunction with flow diagram 1600 (FIG. 16). Unlike in the previously described calendar embodiment, the "Join Now" menu item is displayed along with other options, such as "Snooze" and "Dismiss" when the reminder window pops up. That is, unlike the calendar view embodiment, the user need not call up a menu in order to access the "Join Now" menu item. However, conveniently, in both the calendar and reminder window embodiments, the attendee is able to initiate joining to conference call from reminder screen 420 without having to access a detailed view of the conference call event to obtain the dial-in number and security code, and thereafter, manually dialing in and entering the security code.

Certain adaptations and modifications of the described embodiments can be made. Therefore, the above discussed embodiments are considered to be illustrative and not restrictive.

For example, the disclosed method may function in conjunction with the "day view", "agenda view" and "week view" of the calendar application. However, as will be appreciated by those of ordinary skill in the art, other types of calendar views may be available (e.g. "month view"). To this end, a "Join Now" menu item could be added to a menu accessible through a user interface component associated with the conference call event in other calendar views.

Moreover, as described above, the calendar application and reminder window are two components of PIM application module 2130C. However, PIM application module 2130C may include other time management software applications such as a task list or journal. The disclosed method may also function in conjunction with these other time management software applications.

In a further alternative, the "Join Now" menu item may be added to a menu of the existing calendar application and as another button in a reminder window of mobile device 11/11'. For example, an update to the calendar application may be installed on mobile device 11/11', which update adds the "Join Now" functionality (and associated menu item) to a menu of the calendar application. Similarly, the application that displays reminder window 420 may be updated, which update adds a "Join Now" button and associated functionality to the reminder window. In this regard, a dedicated conference call management application need not be installed on mobile device 11/11'.

What is claimed is:

1. A computer-implemented method of joining a user to a conference call event, the method comprising:
 displaying, at a mobile device, an interface associated with an application providing a conferencing service, the interface comprising displaying information relating to the conference call event including a date for a conference call which is subject of the conference call event and a start time of the conference call;
 displaying, at the mobile device, while displaying the interface, one or more selectable options including a selectable option to automatically initiate joining to the conference call;
 receiving an indication of a selection of the selectable option to automatically initiate joining to the conference call;
 locating, by the mobile device, information associated with the conference call, the information including a telephone number for a conference call bridge; and
 initiating, by the mobile device, connection with the conference call bridge using the telephone number.

2. The computer-implemented method of claim 1 wherein the displaying the interface associated with the application providing the conferencing service comprises displaying an interface component associated with the conference call event.

3. The computer-implemented method of claim 2 wherein the one or more selectable options are displayed after receiving an indication of a selection of the interface component.

4. The computer-implemented method of claim 3 wherein the displaying the interface comprises displaying an entry for the conference call event in a calendar view of the interface.

5. The computer-implemented method of claim 4 wherein the interface component comprises a display of a calendar event.

6. The computer-implemented method of claim 3 wherein the one or more selectable options further include a selectable option to create a new calendar entry, a selectable option to open the selected conference call event, and a selectable option to present a different calendar view of calendar events.

7. The computer-implemented method of claim 1 wherein the displaying information relating to the conference call event includes displaying an end time of the conference call.

8. The computer-implemented method of claim 1 wherein the receiving an indication of the selection comprises receiving an indication of a user interaction with the interface.

9. The computer-implemented method of claim 1 wherein the conference call event is managed by a conference call system including the conference call bridge and the locating information associated with the conference call includes locating in a database the telephone number and a security code associated with the conference call event, and wherein the computer-implemented method further comprises providing the security code to the conference call system after connection to the conference call system subsequent to the initiating connection with the conference call bridge.

10. The computer-implemented method of claim 1 wherein commencing the displaying the one or more selectable options occurs simultaneously with commencing the displaying the interface.

11. The computer-implemented method of claim 1 wherein the displaying the interface comprises displaying a reminder window for the conference call event, and further comprising displaying the reminder window at a pre-configured time preceding the start time of the conference call.

12. The computer-implemented method of claim 11 wherein the one or more selectable options further include a selectable option to dismiss the reminder window and to cease to display the reminder window after receiving an indication of a selection of the selectable option to dismiss.

13. The computer-implemented method of claim 1 wherein all conference participants are connected to the conference call independent from the host.

14. The computer-implemented method of claim 1 wherein the user is not the host.

15. A mobile communications device for joining a user to a conference call event, said device comprising:
 a display;
 a non-transitory computer-readable medium configured to store instructions; and
 one or more processors configured to execute the instructions to cause the device to:
  provide, on the display, an interface associated with an application providing conference service, the data comprising information relating to the conference call event including a date for a conference call which is subject of the conference call event and a start time of the conference call,
  provide, on the display, one or more selectable options including a selectable option to automatically initiate joining to the conference call, the data for displaying the one or more selectable options being provided concurrently with the data for displaying the interface,
  receive an indication of a selection of the selectable option to automatically initiate joining to the conference call,
  locate information associated with the conference call, the information including a telephone number for a conference call bridge, and
  initiate connection with the conference call bridge using the telephone number.

16. A computer-implemented method of joining a user to a conference call event, the method comprising:
 displaying, at a mobile device, an interface associated with a calendar application, the interface comprising displaying information relating to the conference call event including a start time and an end time of a conference call which is subject of the conference call event;
 after receiving an indication of a selection of the conference call event, displaying, at the mobile device, with the interface, one or more selectable options, the one or more selectable options including a selectable option to automatically initiate joining to the conference call;

after receiving an indication of a selection of the selectable option to automatically initiate joining to the conference call, locating, by the mobile device, information associated with the conference call, the information including a telephone number for a conference call bridge; and initiating, by the mobile device, connection with the conference call bridge using said telephone number.

17. The computer-implemented method of claim 16 wherein the locating information associated with the conference call comprises locating the information in a database.

18. A computer-implemented method of joining a user to a conference call event, the method comprising:

at a pre-determined time in advance of a start time associated with a conference call event, simultaneously initiating a display, at a mobile device, of (i) a reminder window displaying information relating to the conference call event and (ii) one or more selectable options including a selectable option to automatically initiate joining to the conference call;

after receiving an indication of a selection of the selectable option to automatically initiate joining to the conference call, locating, by the mobile device, information associated with the conference call, the information including a telephone number for a conference call bridge; and initiating, by the mobile device, connection with the conference call bridge using the telephone number.

19. The computer-implemented method of claim 18 wherein the locating information associated with the conference call comprises locating the information in a database.

20. A computer-implemented method of joining a user to a conference call event, the method comprising:

displaying, at a mobile device, a user interface associated with an application providing a conferencing service, the user interface comprising displaying information relating to the conference call event including a date for a conference call which is subject of the conference call event and a start time of the conference call;

displaying, at the mobile device, while displaying the user interface, one or more selectable options available to the user, the one or more selectable options including a selectable option to automatically initiate joining to the conference call;

after receiving, from the user, a selection of the selectable option to automatically initiate joining to the conference call, locating, by the mobile device, information associated with the conference call, the information including a dial-in telephone number; and initiating, by the mobile device, dialing of the dial-in telephone number.

21. The computer-implemented method of claim 20 wherein the locating information associated with the conference call comprises locating the information in a database.

22. A non-transitory computer-readable medium that stores a set of instructions that are executable by at least one processor of a device to cause the device to perform a method, the method comprising:

facilitating, at the device, a display of an interface associated with an application providing conferencing service, the interface comprising information relating to the conference call event including a date for a conference call which is subject of the conference call event and a start time of the conference call;

facilitating, at the device, a display of one or more selectable options including a selectable option to automatically initiate joining to the conference call, the display of the one or more selectable options being concurrent with the display of the interface;

acquiring an indication of a selection of the selectable option to automatically initiate joining to the conference call;

locating information associated with the conference call, the information including a telephone number for a conference call bridge; and initiating connection with the conference call bridge using the telephone number.

* * * * *